(12) United States Patent
DeLuca et al.

(10) Patent No.: US 6,725,138 B2
(45) Date of Patent: Apr. 20, 2004

(54) AUTOMOBILE LOCK AND LOCATE METHOD AND APPARATUS

(76) Inventors: Michael J. DeLuca, 734 Camino Gardens La., Boca Raton, FL (US) 33432; Kathy Lynch, 15257 Ixora Rd., Delray Beach, FL (US) 33484; Joan S. DeLuca, 734 Camino Gardens La., Boca Raton, FL (US) 33432

( * ) Notice: Subject to any disclaimer, the term of this patent is extended or adjusted under 35 U.S.C. 154(b) by 20 days.

(21) Appl. No.: 10/054,237

(22) Filed: Jan. 22, 2002

(65) Prior Publication Data

US 2003/0139878 A1 Jul. 24, 2003

(51) Int. Cl.[7] .............................. G01S 3/02; E05B 65/12
(52) U.S. Cl. .................... 701/36; 701/213; 340/426.17; 342/357.08
(58) Field of Search .......................... 701/49, 213, 300, 701/1, 36, 207; 340/426, 989, 825.49, 426.17, 426.13, 426.19; 342/357.08, 357.13, 357.17; 307/10.2

(56) References Cited

U.S. PATENT DOCUMENTS

| | | | |
|---|---|---|---|
| 5,612,688 A | * 3/1997 | Masudaya | 340/988 |
| 5,648,763 A | 7/1997 | Long | |
| 5,991,690 A | 11/1999 | Murphy | |
| 6,093,980 A | 7/2000 | Yamamoto et al. | |
| 6,116,201 A | 9/2000 | LaBelle | |
| 6,148,202 A | 11/2000 | Wortham | |
| 6,172,640 B1 | * 1/2001 | Durst et al. | 342/357.07 |
| 6,236,918 B1 | 5/2001 | Sonoda et al. | |
| 6,360,169 B1 | * 3/2002 | Dudaney | 701/213 |
| 6,363,324 B1 | * 3/2002 | Hildebrant | 701/213 |
| 6,392,592 B1 | * 5/2002 | Johnson et al. | 342/357.07 |
| 6,405,125 B1 | * 6/2002 | Ayed | 701/200 |
| 6,489,921 B1 | * 12/2002 | Wilkinson | 342/357.08 |
| 2003/0020638 A1 | * 1/2003 | Sari et al. | 340/995 |

FOREIGN PATENT DOCUMENTS

JP    2000-145223    * 5/2000

* cited by examiner

Primary Examiner—Michael J. Zanelli
(74) Attorney, Agent, or Firm—IdeoCo.com

(57) ABSTRACT

A battery operated portable device, or "lockator" facilitates location of a parked automobile within having an unknown or forgotten location. The lockator locks, unlocks and locates the automobile with a simplified user interface. The locator has a combined automobile door lock and unlock transmitter and GPS locator. Pressing a lock button both transmits a lock signal and substantially determines the automobile location. Pressing the unlock button transmits the unlock signal and determines the direction back to the location where the lock button was pressed. Left and right icons on the lockator direct the driver back to the vehicle. The icons blink at a rate indicative of the distance to the automobile and indicate if the driver is heading away from the automobile. Measures are take to conserve power drawn from a battery powering the lockator.

20 Claims, 3 Drawing Sheets

AUTOMOBILE LOCK AND LOCATE METHOD AND APPARATUS

FIELD OF THE INVENTION

This invention relates to the field of automotive control and location determination.

BACKGROUND OF THE INVENTION

Automobile parking lots have grown in size due in part to the development of large department stores and shopping malls. Often times a driver of an automobile parks in the large parking lot for shopping or other business. When the driver returns to the parking lot the driver may not be able to remember the location of the automobile and thus can waste a significant amount of time hunting for the automobile in the large parking lot. Modem automobiles often are manufactured with a key having an attached remote transmitter that allows the driver to remotely lock or unlock the automobile while the automobile is within a limited wireless transmission range. Such remotes are also available on an after market installation basis. Often, the automobile will sound a horn, flash exterior lights or other audio/visual alert when the remote transmitter is activated in the vicinity of the automobile, thereby facilitating location of the automobile within the limited range. Unfortunately, this limited range between the transmitter and automobile and the limited range of the automobile's audio/visual alert only allows a driver to pinpoint the automobile location if the automobile is close to the driver. This method is of very little use in locating an automobile in a very large parking area or far from the driver.

The advent of global positioning systems (GPS) has allowed determination of a location virtually anywhere on the surface of the planet where the GPS signal can be received. However, consumer GPS devices are usually general purpose having a complex user interface an expensive display. Furthermore, many consumer grade GPS receivers have inaccurate pinpoint location and can only guide to a location which is close, but are incapable of pinpoint accuracy. Furthermore, GPS devices typically operate continuously and consume a large amount of power, thus rapidly depleting batteries used to power portable GPS receivers.

Thus, what is needed is a simple portable device for locating an automobile which takes advantage of the benefits of both GPS and remote transmitter location determination without rapidly depleting batteries powering the device.

DETAILED DESCRIPTION OF THE INVENTION

Figure 1:
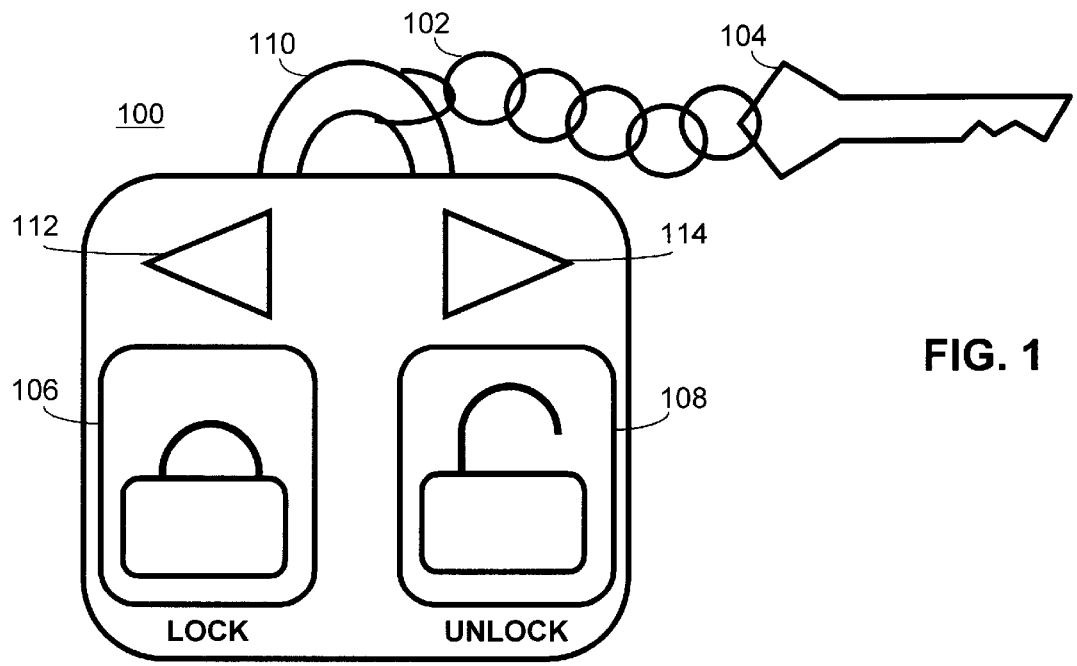
FIG. 1 illustrates a remote transmitter and locator, or "lockator" operating in accordance with the present invention.

FIG. 1 illustrates a remote transmitter and locator, or "lockator" operating in accordance with the present invention. The remote lockator 100 is preferably attached through a chain 102 to a key 104 for starting the automobile. Alternatively the key 104 and lockator 100 could be integrated or the mechanical key portion 104 and chain 102 eliminated. The remote lockator has lock and unlock buttons 106 and 108 for locking and unlocking the automobile. Pressing the lock button within the limited range between the automobile and remote lockator, the limited range may be as great as 30 meters or more, causes the automobile doors to lock. Pressing the unlock button within the limited range causes the automobile doors to unlock. Such locking and unlocking also causes the automobile to generate an audio and visual alert such as tooting the horn and flashing the lights. Such locking and unlocking may also activate and deactivate, respectively, an automobile alarm system. The remote lockator 100 also has a GPS receiver that, in response to pressing the lock button activates the GPS receiver and determines the location of the remote transmitter, which substantially corresponds to the stationary location of the vehicle. This location is indicative of the location of the parked automobile. Thus, the automobile is both locked and its location automatically determined by the single manual act of pressing of the lock button. Since drivers are used to locking their automobiles after parking, coupling locking to location determination automatically facilitates determination of the location of the parked vehicle by the simple act of locking it. Thus, the driver does not need to remember additional steps or operations to record the location of the parked vehicle other than the act of locking it.

Pressing the unlock button 108 with a second manual input causes transmission of the unlock signal to the automobile. If the automobile is within the limited range, the vehicle unlocks and an audio/visual alert generated facilitating pinpoint location of the automobile. If the driver is beyond the limited range and continues to hold the unlock button, the GPS receiver powers on and determines the current location of the driver and compares it to the stationary location of the automobile recorded when the lock button was pressed. The orientation of the remote transmitter is determined wherein the chain retainer 110 indicates the heading of the remote transmitter. Other heading indicators may be used, such as the key itself if the key and lockator are integrated, or the heading marker may be otherwise implied in the user interface configuration, or alternately all together eliminated. Thereafter left and right icons 112 and 114 are activated in order to guide the driver to the stationary location. If the vehicle is to the left then the left icon is displayed. If the vehicle is to the right of the heading, then the right icon is displayed. If the vehicle is along the heading then both icons are displayed. The icons may be flashed at a rate indicative of the distance to the automobile wherein the flash rate increases as the driver moves closer to the vehicle. A special alert may be generated if the distance between the driver and the stationary location increases rather than decreases. When the lockator determines that the distance between the driver and the stationary location is sufficiently small, the unlock transmitter is again activated, facilitating pinpoint location of the automobile by the toot of the horn and flash of lights of the automobile audio/visual alert.

In alternate embodiments, the lockator may have additional functions and/or buttons including opening doors or trunks and initiating panic alarms.

Figure 2:
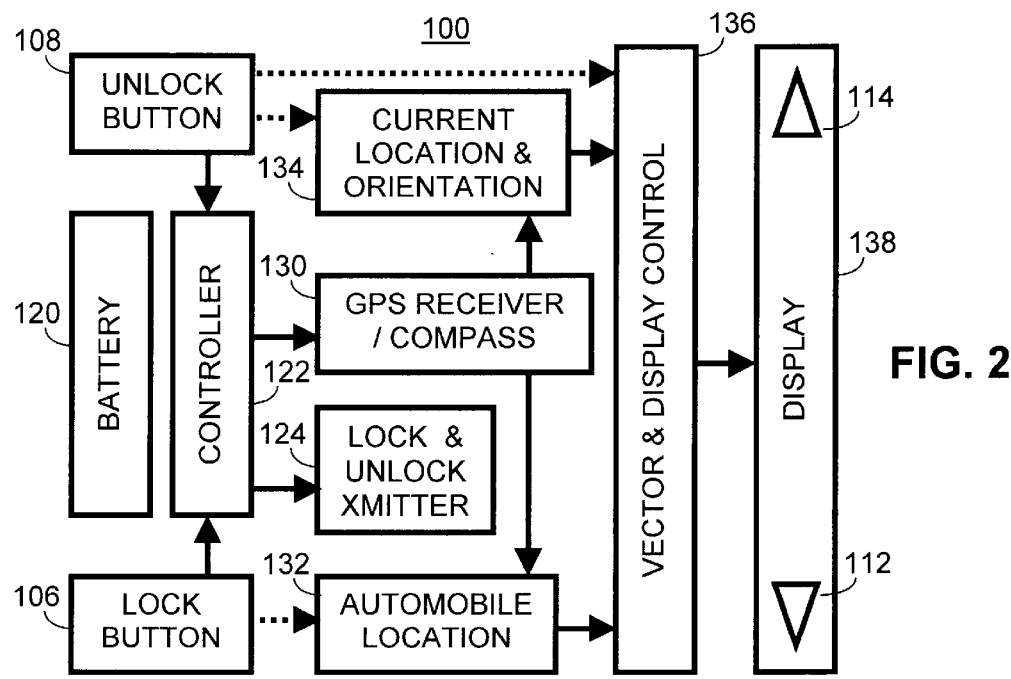
FIG. 2 shows a block diagram of an apparatus operating in accordance with the present invention.

FIG. 2 shows a block diagram of an apparatus operating in accordance with the present invention. Lockator 100 has the aforementioned lock and unlock buttons 106 and 108 as well as left and right icons 112 and 114. Battery 120 provides power for the functions of the locator. A controller 122 controls the operations of the locator and may be either a microprocessor on an application specific integrated circuit. The lockator includes a lock and unlock transmitter 124 for wirelessly transmitting signals to the automobile, including lock and unlock signals. The locator also includes a GPS receiver 130 for determining location. The GPS receiver may also include an electronic compass for facilitating determination of orientation. Alternatively orientation may be determined by determining location of movements of the locator, or other means know to those familiar with the art. A memory stores the stationary location of the automobile at location 132, which is determined in response to receiving a manual input at the lock button 106. The memory also stores current locations and orientation information at location 134, which is determined in response to a manual input at the unlock button 108. Direction vector and display control determine a direction vector by comparing the stationary location 132 and the current location and orientation 134 in order to determine a direction vector from the current to the stationary location. From the direction vector, distance information and left and right direction information is determined. A display 138 includes left and right icons 112 and 114 and is preferably two LEDs, one for each icon. Alternative displays are also contemplated, including a LCD or larger multi-function displays, such as a display found on a hand held personal computer integrating the simplified user interface and automotive control functions of the locator.

Figure 3:
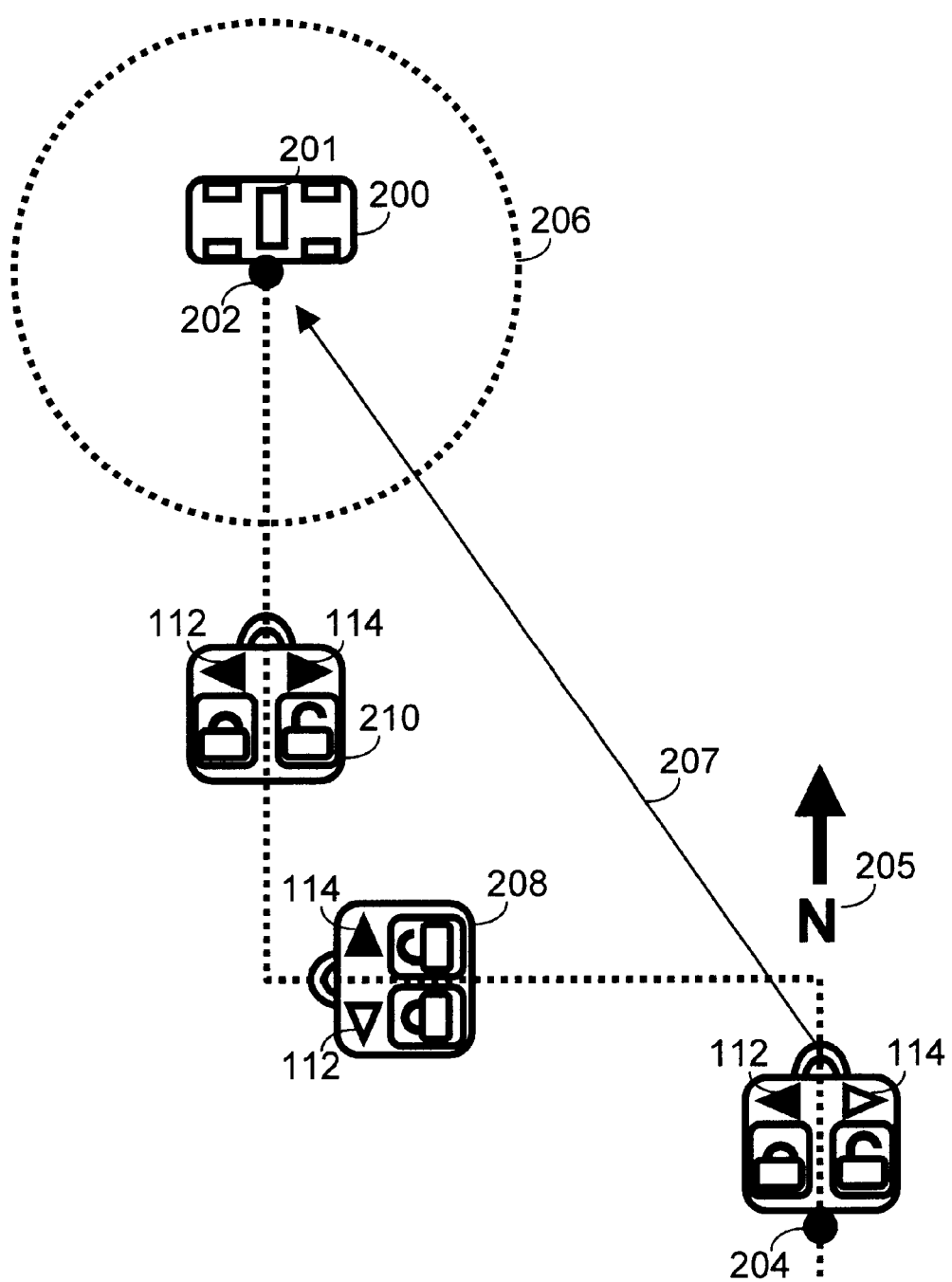
FIG. 3 shows an illustration of the use of a device operating in accordance with the present invention.

FIG. 3 shows an illustration of the use of a device operating in accordance with the present invention. An automobile 200 is parked in a parking lot. The driver presses the lock button on the locator at stationary location 202. The lock signal is transmitted, a receiver 201 installed within the automobile 200 receives the lock signal and causes at least one door of the vehicle to lock. Both the vehicle is locked and the GPS location of the lockator is determined, the determined location substantially corresponding to the location of the automobile. Sometime later the driver desires to determine the location of the automobile at location 204. The unlock button is pressed, since the lockator is beyond the limited range 206, the unlock transmission is not received by the vehicle. Holding the unlock button causes the GPS receiver to activate and determine current location 204. The compass determines the heading of the locator to correspond to North. Thereafter direction vector 207 is determined from the orientation 205, current location 204 and stationary location 202. Since the direction vector points to the left of the orientation, the left icon 112 is illuminated. Furthermore, the icon blinks at a rate indicative of the distance between locations 202 and 204. Thereafter, the unlock button is released, the driver walks to the left and again presses the unlock button at location 208. Since the lockator is still beyond the limited range 206 the unlock transmission is not received by vehicle 200. Holding the unlock button causes the GPS receiver to determine the current location 208. The compass determines the orientation of the locator to correspond to west. Thereafter, an new direction vector is determined (not shown). Since the direction vector points to the right of the orientation, the right icon 112 is illuminated. Furthermore, the right icon blinks at a faster rate at location 208 relative to the blink rate at location 204 because the vehicle is now closer. Thereafter, the unlock button is again released deactivating the GPS receiver. The driver walks to the right and again presses the unlock button at location 210. Since the lockator is still beyond the limited range 206 the unlock transmission reception by vehicle 200, it is not received. Holding the unlock button causes the GPS receiver to determine the current location 210. The compass determines the orientation of the locator to correspond to north. Thereafter, a new direction vector is determined (not shown). Since the direction vector points in substantial coincidence with the orientation, both left and right icons 110 and 112 are illuminated. Furthermore, both icons blinks at a faster rate at location 210 relative to the blink rate at location 208 because the vehicle is now closer. If the driver continues to hold the unlock button and walk towards the vehicle, the blink rate will increase. When the lockator determines the unlock signal is likely to be received, corresponding to the distance being within circle 206, the unlock signal is continuously transmitted for as long as the unlock button is pressed. When the automobile receives the unlock signal, the doors are unlocked and audio/visual alert generated by tooting the horn and flashing the lights. Since many commercial GPS receivers are not able to accurately pinpoint a location, the selective transmission of the unlock signal allows the driver to pinpoint the location of the vehicle when it is close, but does not expend power continuously transmitting the unlock signal when the vehicle is far from the driver.

It should be noted that a special alert may be generated if the distance to the stationary location increases rather than decreases. For example, if the orientation is south instead of north at location 210 and the driver proceeded south then the special alert would be generated. The special alert is preferably alternate flashing of the left and right icons. This gives the driver a clear indication of heading in the wrong direction.

Figure 4:
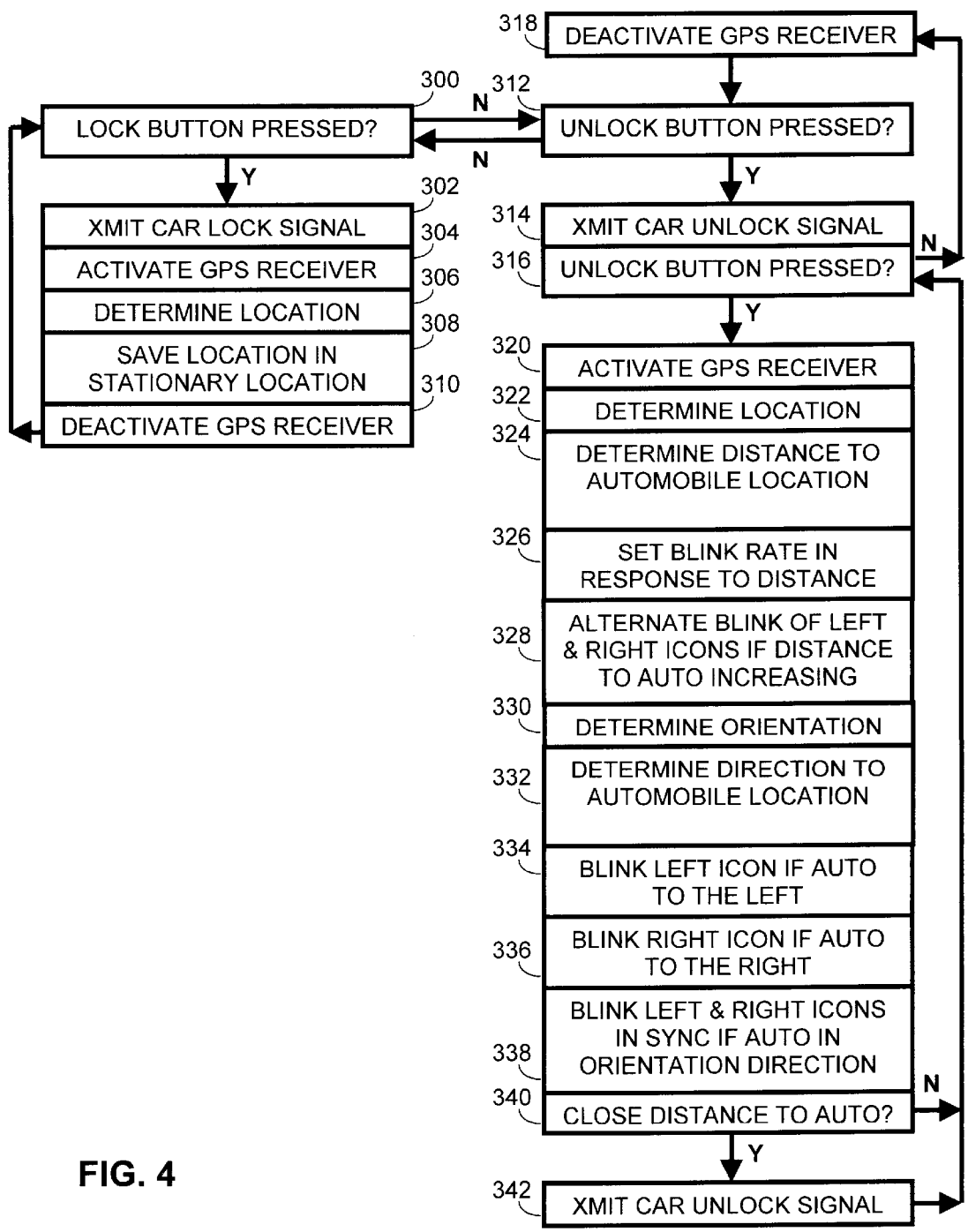
FIG. 4 shows a flow diagram of a method operating in accordance with the present invention.

FIG. 4 shows a flow diagram of a method operating in accordance with the present invention. In step 300, the lock button is pressed by a manual input from the driver. Step 300 determines if a manual input is received at the lock button by being pressed. If true the lock signal is transmitted, the GPS receiver activated, location determined and saved in the stationary location and the GPS receiver deactivated at steps 302-310. Note that the GPS receiver is activated only long enough to determine the stationary location and then automatically deactivated, thereby conserving lockator battery power.

If the lock button is not pressed at step 300 then step 312 checks for the unlock button to be pressed. Steps 300 and 312 are repeated until either button is positively pressed. Upon receiving a second manual input of pressing the unlock button, step 314 transmits the car unlock signal. The transmission may occur for a predetermined time, or the signal may be sent a preset number of times and the transmission of the signal terminated. If at step 316 the unlock button is not pressed then step 318 deactivates the GPS receiver, which is a non-event because it remained inactive in this portion of the example, and steps 300 and 312 are repeated. Thus, if the driver is close to the automobile, pressing the unlock button results in the doors unlocking and the driver observing the horn tooting and light flashing alert of the automobile. The driver then releases the unlock button in response thereto. Because of the delay associated with step 314, the GPS receiver is never activated, thereby conserving lockator battery power. If the unlock button remains pressed, the driver has not likely heard the horn toot or seen the light flash and is thus likely far away from the automobile. In response, the GPS receiver is activated at step 320, the current location is determined at step 324, and the distance to the stationary location of step 306 determined at step 324. Step 326 sets the icon blink rate in response to the distance determined at step 324. The blink rate may be linearly or nonlinearly related to the distance and includes frequency or duty cycle modulation. The preferred blink rate has a constant frequency of one blink per second with an ON time of 95% if the lockator is substantially close to a 5% ON duty cycle if the lockator is more than one thousand yards away, with a linear variation there between. Step 328 determines if the distance to the automobile is increasing and generates a special alert. This is done by comparing distance from a new current position with the distance from a prior current position, if the new distance is substantially greater, by a predetermined amount of one yard for example, then the special alert is generated. The special alert may be the alternate flashing of the left and right icons, flashing of a third icon (not shown) or an audio alert.

Thereafter, step 332 determines the orientation of the lockator. This may be done with a electronic compass on an integrated circuit or successive GPS location measurements or other means known to those familiar with the art. Thereafter the direction vector to the vehicle is determined relative to the orientation of the lockator, as shown by arrow 207 of FIG. 3. If the direction is to the left or right, then the left or right icon is set to blink at the blink rate of step 326. If the vector is in substantial coincidence with the vector, then step 338 sets both left and right icons to blink at the blink rate of step 326. Step 340 determines if the lockator's current position is close to the stationary position, if so, the unlock signal is transmitted from the lockator's transmitter for a predetermined time or number of unlock signals. Transmission of the unlock signal causes the automobile to generate an alert. This advantage is helpful for either of at least two reasons. First the GPS location system may not be accurate enough to pinpoint the location of the automobile, in which case the automobile alert provides a second locating system which facilitates the driver precisely locating the automobile after the GPS system brings the driver in close. Second, even if the GPS system is able to pinpoint the stationary location, the automobile alert could prove a substantially more convenient user interface than the lockator's left/right user interface in pinpointing the location of the automobile because of the driver's ears and eyes can more naturally locate the automobile. Furthermore, the stationary position may substantially albeit not precisely correspond to the location of the automobile because the lock button may be pressed a distance away from the automobile, the automobile alert may better facilitate the pin point location of the automobile by the driver when the driver is close.

Thereafter, step 316 is returned to and steps 320 to 340 are repeated until the unlock button is released. Upon release of the unlock button the GPS receiver is deactivated. The driver may press and hold the unlock button allowing constant update of the left and right icon display. Although this may increase battery power consumption, the driver may rotate position left or right in response to the icons until both icons are ON indicating the direction of the vehicle, with the blink rate indicating the distance to the vehicle. By taking a few steps in the indicated direction, the driver may be assured that the distance to the vehicle is being reduced by the absence of a special alert. The continued blinking of the icons at an increasing duty cycle indicates the driver is traveling closer to the vehicle. In an alternate embodiment the left and right icons may be eliminated in favor of an icon that indicates simply that the distance is increasing or decreasing.

It should be noted that the lockator's operation facilitates conservation of battery power. The transmitter is only powered ON in response to pressing the lock or unlock buttons, and automatically powers off. Similarly, the GPS receiver only powers ON in response to the lock button being pressed and automatically switches OFF after determining the stationary location. Also, the GPS receiver only powers ON after the unlock button is pressed and held, giving the driver time to listen or observer the automobile's alert, before the GPS receiver is powered ON. Thereafter, the GPS receiver remains ON for so long as the unlock button is pressed. However, the unlock transmitter is inhibited until the distance to the automobile is such that the unlock signal is likely to be received, thereby conserving power. It should be further noted that the locator and lock/unlock receiver incorporated in the automobile may be either original equipment in a new automobile, or incorporated on an after market basis. The after market allows the lockator to be used with existing vehicles which do not have integral GPS systems.

Numerous alternate embodiments are within the scope of the invention. For example, the lockator could have a third unlock button for continuously transmitting the unlock signal when pressed. This would be useful if the driver knew the location of the vehicle and did not require the activation of the GPS receiver, thereby conserving lockator battery power. In this embodiment, step 314 could optionally be eliminated. In yet another alternate embodiment, if the automobile had an integral GPS receiver, the stationary location could be determined by the automobile's GPS receiver and communicated electronically to the lockator when the vehicle's ignition was stopped or the key and lockator assembly removed, thereby conserving power required for the lockator's GPS receiver to determine the stationary position. The manual act by the driver of turning off the vehicle's ignition or key removal is also indicative of the vehicle being in a stationary mode and thus having a stationary location. The stationary location could be communicated through a detachable connector or through a wireless communication protocol such as Bluetooth or 902.11b. In yet another embodiment, the simple manual act of the driver opening the door and/or walking away from the vehicle with the lockator could be a sufficient manual input to either cause communication of the stationary location from the automobile or cause the lockator to determine the stationary location. In yet another embodiment, another type of location/orientation determining system may be used, other than GPS.

Thus, what is provided is a simple portable device for locating an automobile which takes advantage of the benefits of both GPS and remote transmitter location determination without rapidly depleting batteries powering the device.

We claim:

1. A method performed within a portable device for determining a location of a stationary vehicle comprising the steps of:

receiving a manual input by the press of a button upon the portable device for placing the vehicle in a stationary mode;

wirelessly transmitting a locking signal from the portable device for locking a door of the vehicle in response to the manual input; and determining a stationary location substantially corresponding to the vehicle in response to the manual input wherein said step of determining the stationary location includes the step of activating a location determining device in response to the manual input.

2. The method according to claim 1 wherein said step of determining the stationary location further
  includes the steps of:
determining the stationary location of the portable device
  by the location determining device; and
deactivating the location determining device in response
  to determining the stationary location; and
storing the stationary location in a stationary location
  memory located within the portable device.

3. The method according to claim 2 wherein the portable device is battery powered and the method further conserves battery power wherein
said step of activating the locating determining device
  enables substantial battery power consumption by the
  location determining device, and
said step of deactivating the location determining device
  disables substantial battery power consumption by the
  location determining device.

4. The method according to claim 1 further comprising the steps of:
storing the stationary location in a memory within a
  portable device having first and second displayable
  icons;
receiving a second manual input at the portable device;
determining a current location and a current orientation of
  the portable device;
determining a direction vector from the current location to
  the stationary location; and
activating the first icon if the direction vector is left of the
  current orientation; or
activating the second icon if the direction vector is right
  of the current orientation.

5. The method according to claim 4 further comprising the step of activating both first and second icons if the direction vector is in substantial coincidence with the current orientation of the portable device.

6. The method according to claim 4 further comprising the steps of;
determining if the portable device is substantially close to
  the vehicle; and
transmitting a signal in response thereto, wherein the
  vehicle generates an audio or visual alert in response to
  reception of the transmitted signal.

7. The method according to claim 1 further comprising the steps of:
storing the stationary location in a memory within a
  portable device having a displayable icon;
receiving a second manual input at the portable device;
determining a current location of the portable device in
  response to the second manual input;
determining a distance from the current location to the
  stationary location in response to the second manual
  input; and
activating the icon to provide a blinking signal having a
  rate indicative of the distance.

8. The method according to claim 7 further comprising the step of:
determining a second current location of the portable
  device after said step of determining the current location of the portable device;
determining a second distance from the second current
  location to the stationary location; and
activating the icon to provide a unique signal indicative of
  the second distance being greater than the first distance,
  thereby indicating a substantially increasing distance
  between the portable device and the vehicle.

9. The method according claim 7 wherein the portable device further includes a wireless transmitter for transmitting an unlock signal to the vehicle, the transmitter having a limited range of reception by the vehicle, and the method further comprising the steps of:
transmitting the unlock signal in response to the distance
  from the current location to the stationary location
  being within a criterion indicating a likelihood of
  reception of the unlock signal by the vehicle.

10. The method according to claim 7 wherein the icon includes first and second directional icons further comprising the steps of:
determining a current orientation of the portable device;
determining a direction from the current location to the
  stationary location; and
activating the first directional icon if the direction is left
  of the current orientation with the blinking signal
  having the rate indicative of the distance; or
activating the second icon if the direction is right of the
  current orientation with the blinking signal having the
  rate indicative of the distance.

11. The method according to claim 10 wherein the method is performed within the portable device wherein
said step of receiving the manual input receives the
  manual input by a press of a button upon the portable
  device, and the method further includes the step of
wirelessly transmitting to the vehicle a locking signal for
  locking a door of the vehicle in response to the manual
  input, and further wherein
said step of determining the stationary location includes
    the steps of:
  activating a location determining device located
    within the portable device in response to the
    manual input;
  determining the stationary location with the location
    determining device; and
  deactivating the location determining device in
    response to determination of the stationary location.

12. The method according to claim 9 wherein the portable device is battery powered and the method further conserves battery power consumed by the transmitter, the method comprising the steps of:
inhibiting battery power to the transmitter for transmitting
  the unlock signal in response to a termination of the
  second manual input;
inhibiting battery power to the transmitter for transmitting
  the unlock signal in response to a persistence of the
  second manual input and the criterion indicating no
  likelihood of reception of the unlock signal by the
  vehicle; and
enabling battery power to the transmitter for transmitting
  the unlock signal in response to the persistence of the
  second manual input and the criterion indicating the
  likelihood of reception of the unlock signal by the
  vehicle.

13. A portable device for selectively transmitting an unlock signal of limited range to an automobile comprising:
a memory for storing a stationary location substantially
  corresponding to a location of the automobile;
a location determiner for determining a current location of
  the portable device;
a distance determining processor for processing the current location and the stationary location and for determining a likelihood of reception of the unlock signal by the automobile; and a transmitter responsive to said distance determining processor for transmitting the unlock signal in response to a determination that reception of the unlock signal will likely be received by the automobile.

14. The portable device according to claim 13 further comprising first and second buttons for receiving first and second manual inputs, wherein said location determiner determines the current location in response to the second manual input at the second button, said location determiner further determines the stationary location in response to the first manual input at the first button and stores the stationary location in said memory, and said transmitter transmits a lock signal for locking the automobile in response to the first manual input.

15. A portable device for locating, locking and unlocking an automobile comprising:

a first button for receiving a first manual input;

a GPS location determiner for determining a location of the portable device;

a transmitter for wirelessly transmitting a lock signal for locking the automobile, wherein in response to the first manual input received at said first button, said GPS location determiner determines a stationary location and said transmitter transits the lock signal and further wherein the stationary location substantially corresponds to that of the automobile.

16. The portable device according to claim 15 further comprising:

a second button for receiving a second manual input;

a controller for processing determined locations from said GPS location determiner; and a display for generating an audio or visual alert signal, wherein said GPS location determiner determines a first current location followed by a second current location in response to the second manual input, and said controller determines a first distance between the portable device and the automobile in response to the stationary location and the first current location and further determines a second distance between the portable device and the automobile in response to the stationary location and the second current location and generates an alarm signal in response to the second distance being greater than the first distance, and said display generates the alert signal in response to the alarm signal.

17. The portable device according to claim 15 wherein said GPS location determiner further determines an orientation of the portable device and the portable device further comprising:

a second button for receiving a second manual input;

a controller for processing the determined location and orientation from said GPS location determiner; and a display for displaying left and right direction icons and further wherein, said transmitter further wirelessly transmits an unlock signal for unlocking the automobile, said GPS location determiner determines a current location and a current orientation of the portable device in response to the second manual input received at said second button, said transmitter transmits the unlock signal in response to the second manual input received at said second button, said controller determines a direction vector in response to the stationary location and the current location and generates a left signal in response to the direction vector being left of the current orientation or generates a right signal in response to the direction vector being right of the current orientation, and said display displays the left or right direction icon in response to generation of the corresponding left or right signal.

18. The portable device according to claim 15 further comprising:

a second button for receiving a second manual input;

a controller for processing the determined location from said GPS location determiner; and a display for generating a flashing signal, wherein said GPS location determiner determines a current location in response to the second manual input, said controller determines a first distance to the automobile in response to the stationary location and the current location and further generates a variable flash rate signal indicative of the first distance, and said display generates the flashing signal in response to the flash rate signal, thereby providing a portable device which flashes at a rate indicative of the distance between the portable device and the automobile.

19. The portable device according to claim 15 comprised within a system for remotely locking the automobile further comprising:

a receiver for receiving the lock signal and for causing locking of a door of the automobile wherein the system may be installed in the automobile after manufacture and sale of the automobile.

20. The portable device according to claim 15 comprised within a remotely controlled automobile system comprising:

a receiver for receiving the lock signal and for causing locking of a door of the automobile; and an automobile having at least one lockable door for locking in response to said receiver.

* * * * *